United States Patent [19]

Revankar et al.

[11] Patent Number: 5,767,978
[45] Date of Patent: Jun. 16, 1998

[54] IMAGE SEGMENTATION SYSTEM

[75] Inventors: Shriram V. Revankar; Zhigang Fan. both of Webster, N.Y.

[73] Assignee: Xerox Corporation, Stamford, Conn.

[21] Appl. No.: 792,950

[22] Filed: Jan. 21, 1997

[51] Int. Cl.⁶ .................... H04N 1/40; H04N 1/387; G06K 9/46; G06K 9/60
[52] U.S. Cl. .................... 358/296; 358/298; 358/448; 358/453; 358/462; 382/173; 382/176; 382/224
[58] Field of Search .................... 358/296, 298, 358/448, 453, 456, 462, 465–467, 530, 534, 538; 382/173, 176, 180, 181, 199, 224, 302–304, 308, 309; 395/101, 109, 111, 112, 117, 118

[56] References Cited

U.S. PATENT DOCUMENTS

| | | | |
|---|---|---|---|
| 4,214,276 | 7/1980 | Pugsley et al. | 358/256 |
| 4,521,805 | 6/1985 | Ayata et al. | 358/75 |
| 4,553,172 | 11/1985 | Yamada et al. | 358/280 |
| 4,668,995 | 5/1987 | Chen et al. | 358/462 X |
| 4,807,020 | 2/1989 | Hirosawa et al. | 358/75 |
| 5,001,576 | 3/1991 | Tanaka et al. | 358/462 |
| 5,072,291 | 12/1991 | Sekizawa | 358/462 X |
| 5,101,283 | 3/1992 | Seki et al. | 358/456 |
| 5,181,162 | 1/1993 | Smith et al. | 364/419 |
| 5,225,911 | 7/1993 | Buckley et al. | 358/296 |
| 5,249,067 | 9/1993 | Hirosawa | 358/456 |
| 5,459,832 | 10/1995 | Wolf et al. | 395/155 |
| 5,465,304 | 11/1995 | Cullen et al. | 382/176 |
| 5,475,840 | 12/1995 | Nelson et al. | 395/700 |
| 5,485,568 | 1/1996 | Venable et al. | 395/155 |
| 5,493,634 | 2/1996 | Bonk et al. | 395/101 |
| 5,542,031 | 7/1996 | Douglass et al. | 395/114 |
| 5,625,460 | 4/1997 | Tai | 358/298 |
| 5,638,498 | 6/1997 | Tyler et al. | 395/117 |

FOREIGN PATENT DOCUMENTS

| | | |
|---|---|---|
| 0446008 | 3/1990 | European Pat. Off. |
| 0665677 | 1/1994 | European Pat. Off. |
| 0665676 | 12/1994 | European Pat. Off. |
| 0665675 | 12/1995 | European Pat. Off. |
| 2133657 | 1/1983 | United Kingdom |

*Primary Examiner*—Eric Frahm

[57] ABSTRACT

An adaptable image segmentation system for differentially rendering black and white and/or color images using a plurality of imaging techniques. An image is segmented according to classes of regions that may be rendered according to the same imaging techniques. Image regions may be rendered according to a three class system (such as traditional text, graphic and picture systems), or according to more than three image classes. In addition, only two image classes may be required to render high quality draft or final output images. The image characteristics that may be rendered differently from class to class may include halftoning, colorization and other image attributes.

12 Claims, 5 Drawing Sheets

IMAGE SEGMENTATION SYSTEM

The present invention relates to a digitized rendering system as may be used in black and white or color printing systems (such as in electrophotographic and ink-jet printers and copiers), and more particularly, to an apparatus and method for segmenting black and white or color images.

In the process of digital electrostatographic printing, an electrostatic charge pattern or latent image corresponding to an original or electronic document may be produced by a raster output scanner on an insulating medium. A viewable record is then produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. Non-xerographic systems (such as ink-jet) may be more or less successful in printing high quality images of varying types in and may involve capabilities and/or efficiencies unlike those found in xerographic systems.

In the operation of a copier or printer, particularly color machines, it is highly desirable to have means for variably processing and enhancing text, graphical and pictorial image quality. Particularly in the case of single or multi-pass color printers, it is highly desirable that an image processing system be employed to reduce imaging problems caused by rendering systems which may not be well suited to each type of image. The present invention proposes a system to render portions of an image differentially, according to a segmentation system that can select the most appropriate method to render the various object types present in an image. The present system permits an image to be divided into segments regions, such as those regions may correspond to structural aspects of the image or may be used to distinguish various objects of interest within the entire image on a page.

Various systems have been employed to include those set forth in the following disclosures which may be relevant to various aspects of the adaptable image rendering systems of the present invention:

U.S. Pat. No. 5,493,634
   Patentee: Bank et al.
   Issued: Feb. 20, 1996
U.S. Pat. No. 5,485,568
   Patentee: Venable et al.
   Issued: Jan. 16, 1996
U.S. Pat. No. 5,475,840
   Patentee: Nelson et al.
   Issued: Feb. 20, 1996
U.S. Pat. No. 5,459,832
   Patentee: Wolf et al.
   Issued: Oct. 17, 1995
U.S. Pat. No. 5,249,067
   Patentee: Hirosawa
   Issued: Sep. 28, 1993
U.S. Pat. No. 5,225,911
   Patentee: Buckley et al.
   Issued: Jul. 6, 1993
U.S. Pat. No. 5,181,162
   Patentee: Smith et al.
   Issued: Jan. 19, 1993
U.S. Pat. No. 5,101,283
   Patentee: Seki et al.
   Issued: Mar. 31, 1992
U.S. Pat. No. 4,807,020
   Patentee: Hirosawa et al.
   Issued: Feb. 21, 1989
U.S. Pat. No. 4,553,172
   Patentee: Yamada et al.
   Issued: Nov. 12, 1985
U.S. Pat. No. 4,521,805
   Patentee: Ayata et al.
   Issued: Jun. 4, 1985
U.S. Pat. No. 4,214,276
   Patentee: Pugsley et al.
   Issued: Jul. 22, 1980
UK App: 2 133 657
   Applicant: Seizo et al.
   Priority Date: Jan. 17, 1983
EPO App: 0446008
   Applicant: Hiroyuki
   Priority Date: Mar. 5, 1990
EPO App: 0665675
   Applicant: Naik et al.
   Priority Date: Dec. 26, 1995
EPO App.: 0665676
   Applicant: Winter et al.
   Priority Date: Dec. 27, 1994
EPO App.: 0665677
   Applicant: Winter et al.
   Priority Date: Jan. 27, 1994

U.S. Pat. No. 5,493,634 discloses a decomposing apparatus is provided for use in a printing machine of the type adapted to receive a first set of information written to a printer page description language and a second set of information written in a printer page description language. The apparatus includes an arrangement for performing image related operations on selected components of the first set of image related components.

U.S. Pat. No. 5,485,568 discloses a method and device for describing a complex color raster image as a collection of objects in a hierarchical and device independent format. The purpose of structured imaging is to expand the scope of a raster image to a collection of individually manipulable component objects. A structured image is a hierarchical description of a single output image raster which may be used as one component of a page in a structured document. Objects contributing to the output raster may be text, graphics, other rasters or a combination thereof.

U.S. Pat. No. 5,475,840 discloses a method to dynamically link a new program image and related library programs into an executable application program image. The method provides for producing a linked list of the required programs by giving the linker an argument representing the designated program image and a naming context which contains data on the associated library programs which are to be linked together. The linker finds all of the required programs, and links them together. The parent maps the program images into the designated addressed thereby completing the linking of the executable application program.

U.S. Pat. No. 5,459,832 discloses A subgroup object displayed by a drawing program in a window area as part of a more complex display can be edited by creating a new drawing area or "window" called a "zoom" window and reproducing the subgroup in the new drawing window. Within the zoom window, the subgroup object is effectively broken into its component objects and the component objects can be individually manipulated.

U.S. Pat. No. 5,249,067 discloses a halftone image forming from a contone image with one of a hardware dot generator and a software dot generator. Halftone dots in simpler shapes used in usual reproduction or printing are formed with the hardware dot generator; thus high-speed dot generation is accomplished.

U.S. Pat. No. 5,225,911 discloses a circuit for enabling the raster display of text or line art in one constant color against a background of another constant color or against a continuous-tone picture, or the display of a continuous-tone picture through an arbitrary shape. The second channel stores continuous tone color pictures and presents this information at a third input of the multiplexer. The third channel receives masks or outlines in the form of bitmaps and the fourth channel receives instructions which may be run-length encoded. These two channels combine their data, which is then used to control the multiplexer.

U.S. Pat. No. 5,181,162 discloses an object-oriented document management and production system in which documents are represented as collections of logical components, or "objects", that may be combined and physically mapped onto a page-by-page layout. Stored objects are organized, accessed and manipulated through a database management system. At a minimum, objects contain basic information-bearing constituents such as text, image, voice or graphics. Objects may also contain further data specifying appearance characteristics, relationships to other objects and access restrictions.

U.S. Pat. No. 5,101,283 discloses a halftone image generating apparatus for use in a halftone image generating system for generating threshold value data corresponding to positions in a main scanning direction and a subsidiary scanning direction, comprising a threshold value data generating circuit for generating the threshold value data in a matrix pattern having a variable number of lines and rows, and for converting input picture image data having chromatic gradations into binary value data by comparing the input picture image data to the threshold value data and a circuit for forming a scanning mesh dot image corresponding to the input picture image data.

U.S. Pat. No. 4,807,020 discloses an image reproduction condition data requisite for reproducing the images of plural originals which are stored in a memory. In the system, certain of the data are automatically read and set up to implement circuits which process image data successively for all the originals.

U.S. Pat. No. 4,553,172 discloses scanning and recording an original picture and a character document so as to produce a reproduce synthesized from said picture and said document, picture signals and character signals both generated by the scanning are arranged in data formats of the same word length. Each character signal is caused to correspond to plural fine picture elements that are defined by finely dividing one picture element of the original picture so that the characters may be processed with a resolving power higher than that for said picture.

U.S. Pat. No. 4,521,805 discloses a printing apparatus which has at least one first recording head and at least one second recording head. These recording heads allow recording in binary mode, halftone mode, normal mode, and fine mode.

U.S. Pat. No. 4,214,276 discloses producing a whole page image from a number of separate images, the input images are separately scanned and reproduced at the required enlargement or reduction to produce pre-prints which are then assembled on a digitizer table in the relative positions required for the finished page; signals representing the boundaries of these positions are generated and stored; the boundary representing signals then control the derivation of output signals suitable for a scanner making the whole-page reproduction, each whole-page line signal including the line signals for each of the input images crossed by the page line, the output signals controlling the treatment of a sheet or surface of use in the preparation of a printed page.

UK Application No. 2 133 657 discloses a color separation system comprising a plurality of picture inputs (for supplying a switch selected set of color-separated picture signals corresponding respectively to color components to be subjected to color tone controls. A scanner data processor for receiving the selected set of color-separated picture signals from the plurality of picture input units and containing at least one set of look-up tables adapted to carry out desired color tone controls on the thus-received set of color-separated picture signals; a plurality of picture reproducing units and at least one central processing unit adapted to control the selection of signals and the scanner data processor.

EPO Application No. 0446008 discloses an image processing method comprising the steps of discriminating the color type of an input color image from an input color image signal, generating a pattern signal indicating a predetermined graphic pattern corresponding to the color type in response to said color discrimination, generating a density signal in accord with the input color image signal, and supplying a reproduction signal in accord with said pattern signal and said density signal to an image reproduction unit.

EPO Application No. 0665675 discloses a color printer system including an interactive user interface that allows a choice between one "button" automatic control of color output or multibutton control of color output, with both automatic and manual options providing independent control for color halftoning and for color correction based on the types of objects to be printed. The preferred form allows independent print-rendering options for text, graphics and photo image.

EPO Application No. 0665676 discloses a method of using a printer system for identifying one or more different types of color objects in a document, selecting a preferred rendering option such as halftoning and/or color matching for each one of such different color object type, and then printing the document in accordance with the rendering options selected for each of such different color object types. Blocks 54 are provided for the identification of the object type of document objects. A print driver flags the object with their types at block 54. In a printing system such as an ink-jet color printer coupled through a printer driver to a host computer, a default halftoning technique and a default color-matching map are incorporated into the printer system for automatic invocation whenever a particular color object type (41043) is printed.

EPO Application No. 0665677 discloses the use of different print-quality modes in a printer, such as a color ink-jet printer, invoke different color-rendering options for a particular object to be printed—in a composite document having objects of different types. In an exemplary embodiment, a printer control automatically invokes an error-diffusion halftoning technique for photograph-like images whenever a high-quality print mode is designated, and automatically invokes a dither halftoning technique for photograph-like images whenever a normal or fast print mode is designated.

In accordance with one aspect of the present invention, there is provided an image rendering system for processing a stream of data in a document processing system, the stream of data including segmentable imaging data for rendering an output image, and the output image capable of being differentially rendered according to a plurality of image classes. The image rendering system includes: a segmentor for dividing the imaging data into a plurality of image regions; a selector for assigning the regions to each image class; and a processor, responsive to the selector, for differentially rendering the output image according to at least one of the plurality of image classes.

Other features of the present invention will become apparent as the following description proceeds and upon reference to the drawings, in which.

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

Figure 5:
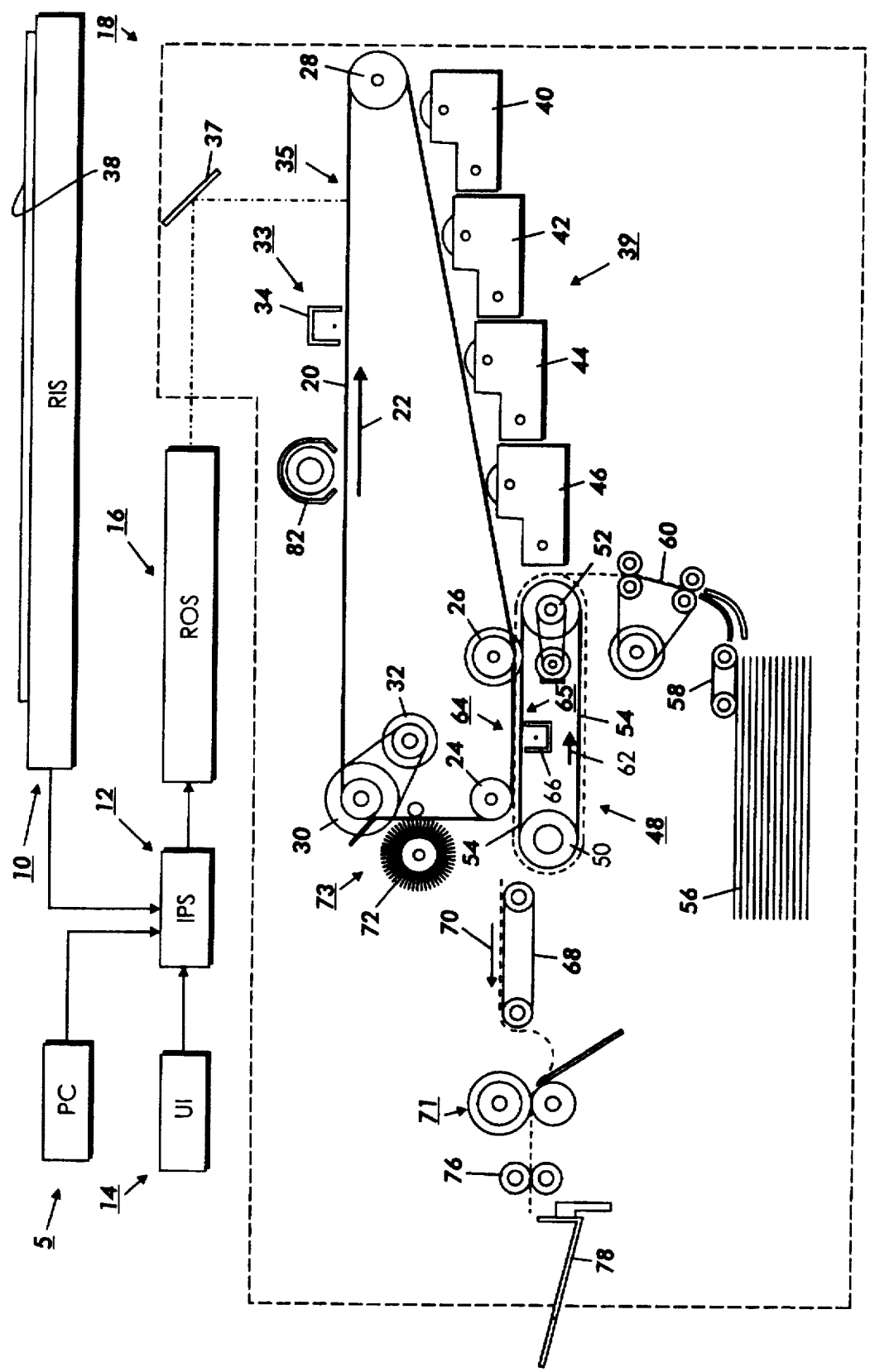
FIG. 5 is a schematic elevational view showing an exemplary color xerographic printing/copying machine and networked PC incorporating features of the present invention therein.

For a general understanding of the features of the present invention, reference is made to the drawings. FIG. 5 is a schematic elevational view showing an exemplary electrophotographic printing/copying machine and a networked PC which may incorporate features of the present invention therein. It will become evident from the following discussion that the system of the present invention is equally well suited for use in a wide variety of printing and copying systems, and therefore is not limited in application to the particular system(s) shown and described herein. An ESS (electronic subsystem) or image processing station (both referred to as IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 5), as well as carry out the image rendering selections in accordance with the present invention as described in association with FIGS. 1 through 4 below.

As further shown in FIG. 5, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Documents in digital or other forms may be created, screened, modified, stored and/or otherwise processed by PC 5 prior to transmission/relay to IPS 12 for printing on printer 18. The display of PC 5 may show electronic documents on a screen (not shown in FIG. 5). IPS 12 may include the processor(s) and controller(s) (not shown in FIG. 5) required to perform the adaptive image rendering system of the present invention.

IPS 12 also may transmit signals corresponding to the desired electronic or scanned image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. (Other implementations may include other pixel resolutions of varying types 600×600 dpi, or even asymmetrical resolutions, such as 300×1200 dpi, both configurations of which are employed in versions of the Xerox 4900 printer family.) The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 5, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 53. A sheet gripper (not shown in FIG. 5) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances the sheet (not shown in FIG. 5) to sheet transport 48. The sheet is advanced by transport 60 in synchronism with the movement of the sheet gripper. The sheet gripper then closes securing the sheet thereto for movement therewith in a recirculating path. The leading edge of the sheet (again, not shown in FIG. 5) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle. As mentioned above, other xerographic and nonxerographic printer hardware implementations may be used with the image segmentation systems of the present invention.

In conjunction with FIGS. 1 through 4, the present invention will be generally be described in terms of its application to a printer or copier such as described above in association with FIG. 5.

The present invention allows different printing properties or methods to be applied to different document image segments. A document image is divided into regions that are to be rendered differentially so as to result in an output image that is more desirable than the unaltered input image. Toward this end, specified regions of a page image are separated into classes, such as the typical text, graphics and pictures is described. (In addition to enhancing printing and copying operations and image quality, the classification of regions into broad basic classes is also useful for automatic storage and retrieval of document images.) Scanned or computer generated electronic document images may be rendered according to various colorization, contrast and/or halftoning techniques, to mention only a few. Some rendering techniques are more suitable for printing text regions, while others are more suitable for printing graphics or picture (bitmap) regions. The quality of the printed image can be efficiently improved by first separating all the regions in a document image that need to be evaluated for differential rendering, and then classifying these regions according to the desired rendering techniques. This region separation and classification mechanism is most desirably automatic so as to be both usefully and easily implemented in day-to-day digital printing or copying operations.

Many commercially available systems facilitate storage and retrieval of various images by attaching external indices to individual document pages and maintaining the indices in a separate database. The indices are often generated manually or according to some automated process that may be slow, expensive and/or labor intensive. The method proposed in this invention proposal enables automatic processing of document images by classifying various regions in a document image into logically separate classes. These classes may be text, graphics and pictures. The may also be hybrids of these three basic classes, or entirely different or additional/more specific classes, depending on the particular desired application.

The image region classification of the present invention is thus sufficiently general and/or adaptable so as to be widely applicable to a variety of image rendering applications. The transition evaluation systems later described are designed to the requirements of a minimal on-line storage architectures such that only a few scan lines of data is available at any time. (Thus minimizing if not eliminating the need for additional hardware or memory, depending on the situation.) The system requires that document image regions be separable and that micro-detection and edge detection data corresponding to those regions are available. The microdetection data provides image intensity classification, whereas the edge detection data provides significant intensity transition information.

One embodiment of the system of the present invention involves an analysis of two ratios, namely (1) the ratio of edges to image region; and (2) the ratio of strong to weak edges. It has been determined that these two ratios operate so as to "cluster" the segmented regions into desired categories for differential rendering, such as, for example, clusters corresponding to the text, graphics, and picture regions. The two quadratic separators that may be used to differentiate these clusters have been formulated by analyzing experimental results. These quadratic separators have also been demonstrated to generate desirable rendered outputs.

Figure 1:
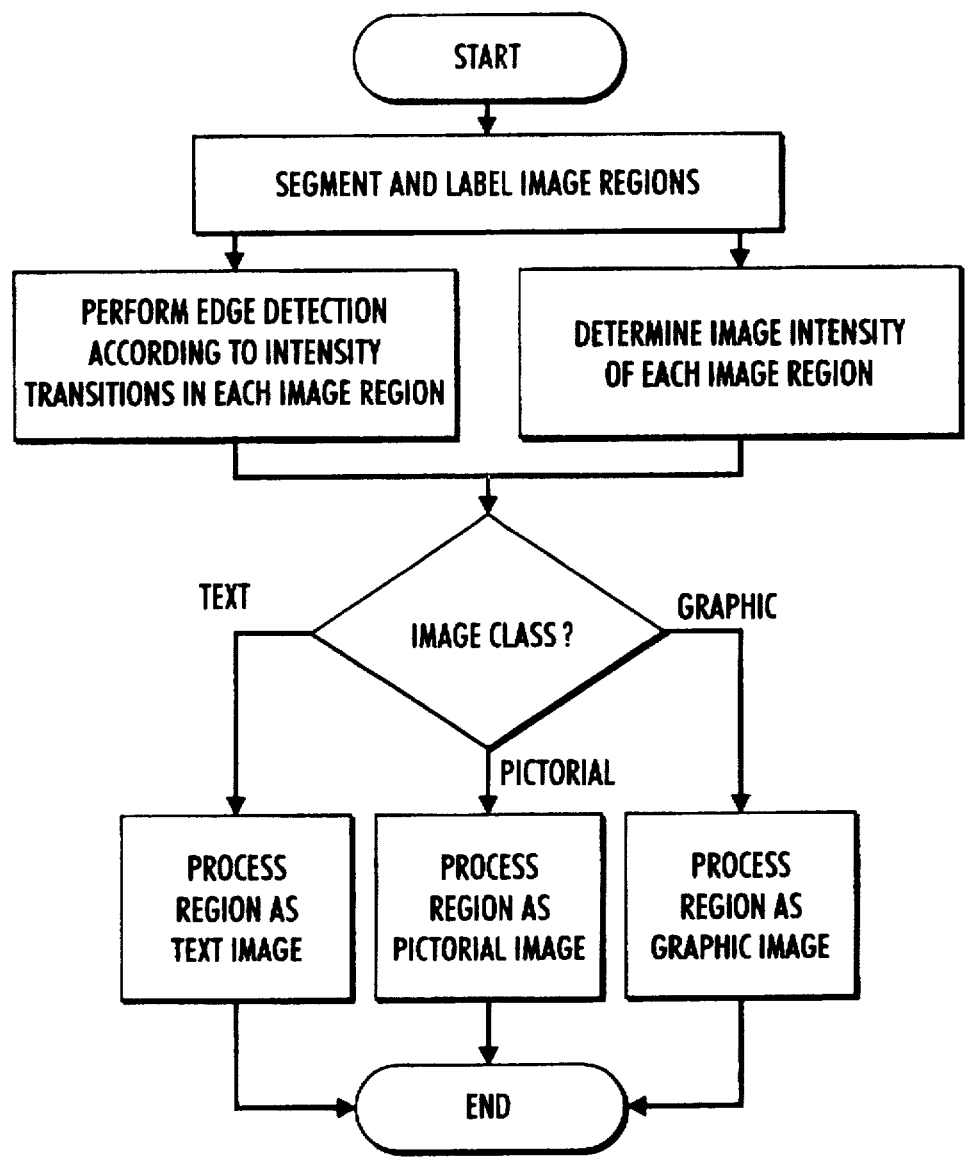
FIG. 1 is an a flow chart of the system of the present invention.

According to the general description system of an embodiment of the present invention set forth in FIG. 1, the input to the evaluation program is made up of scan lines of data from micro-detection, edge detection and image segmentation. The image segmentation stage separates an input image into regions. Output of the segmentation stage contains region labels at each pixel in the input image. An unaltered document is divided in the first stage into regions by analyzing image intensity variations, as shown generally in the "Segment and Label Image Regions", "Perform Edge Detection According to Intensity Transitions in each Image Region" and "Determine Image Intensity of Each Image Region" blocks of the flow chart of FIG. 1. In the second stage, the segmented regions are classified as text, picture or graphics, thereafter to be processed according to the selected or default techniques most appropriate for rendering the particular text, graphic or picture image region.

As will be later described, a set of edge detection counters is maintained for each region label. A default or variable pixel block size is selected. At each pixel block, the background, strong edge, and weak edge counters of the corresponding region are evaluated to determine the edge intensity "label". The micro detection output is then used for "counting" the background pixels in an image region. The edge detection output is also used for counting the number of weak and strong edges in an image region. The necessary statistics of all the regions of the input image are accumulated scan line by scan line. The acquired statistics from these pixel counting/strength evaluation systems thus allows the cluster regions to be divided into the desired classes (such as text, pictorials and graphics). The two quadratic separators may then be employed (discussed below) to differentiate the clusters. Using these separators, each region in the input image is classified as text or graphics or picture regions.

The nature of text objects forms a logical basis for using the edge evaluation data to discrimination text objects from other objects. That is, for example, any text region should possess sharp edges and high contrasts with respect to its background or surroundings, in that good readability is an important attribute of text. Likewise, the nature of pictorial objects forms a logical basis for using the edge evaluation data to discrimination pictorial objects from other objects. Pictures are rendered "natural" images such as photographs of objects, animals, humans and outside scenery; therefore, pictorials are areas that possess few sharp edges, and instead have mostly smooth intensity variations. Region sizes vary widely and observations can only be made on the imaged area of a region. Therefore, the observations with respect to the size of the imaged area of a region must be normalized with respect to the size of the region. The size of the imaged area is computed by subtracting the background area from the total area of a region.

Edge detection is performed in the FIG. 1 system of the present invention by estimating the strength of gray intensity transitions in an image. The intensity transition strength is measured by computing the difference of average intensity values of adjacent pixel blocks of suitably selected size. The intensity transition strength at each pixel into two or more classes is then quantitized. Each class is separated by a threshold; depending on transition strength, the block of pixels is appropriately labeled. Text regions have a large number of strong edges while pictorial regions have a large number of weak edges. In a three "type" classification system, those regions not classified as text or pictorials are by default classified as graphical objects.

Figure 2:
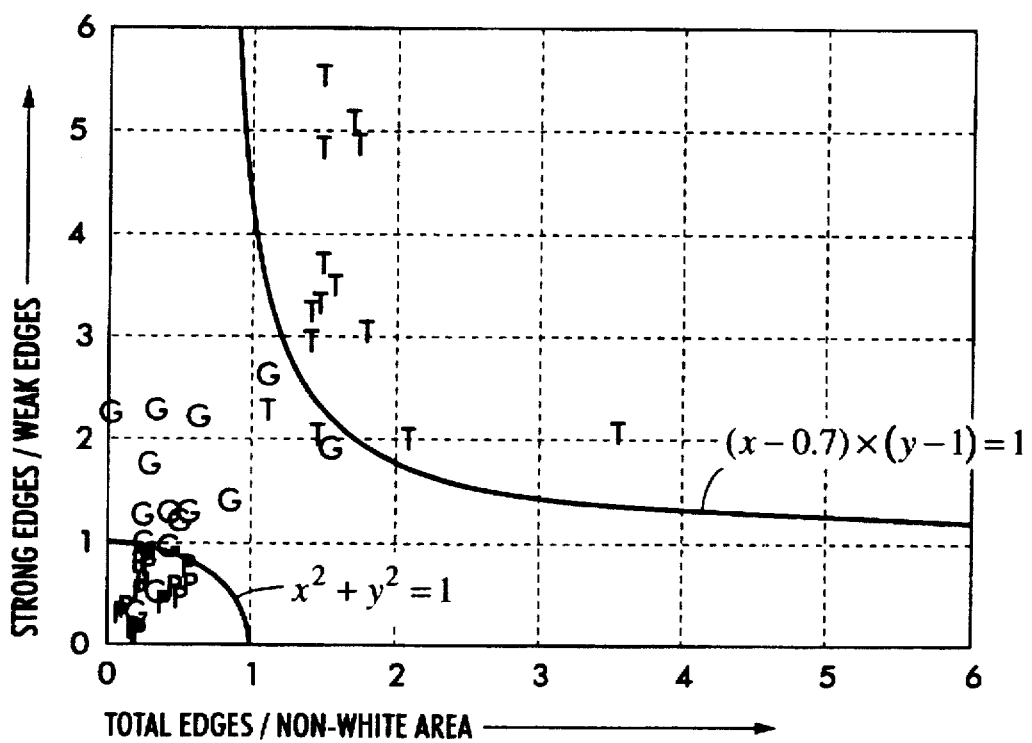
FIG. 2 is a representative plot showing edge detection ratios according to the present invention.

FIG. 2 is a representative plot showing the ratio of area covered by strong edges to area covered by weak edges in a region as the regions, versus the ratio of area covered by edges to the imaged area in the region. The points cluster themselves at different locations in a two dimensional space spanned by the chosen ratios. These clusters can be separated by two quadratic separators shown in FIG. 2. The first separator is a circular arc, and the second separator is a hyperbola. The two quadratic equations for these separators (in the example of separation into text, graphics and pictures) are as follows:

$$\left\{ \alpha \left( \frac{\text{strong edge count}}{\text{weak edge count}} \right)^2 + \beta \left( \frac{\text{total edge count}}{\text{region area} - \text{background area}} \right)^2 \leq 1 \right\} \rightarrow \text{PICTURES}$$

-continued $$\left\{ \left[ \left( \frac{\text{total edge count}}{\text{region area} - \text{background area}} \right) - a \right] \times \left[ \left( \frac{\text{strong edge count}}{\text{weak edge count}} \right) - b \right] \leq c \right\} \rightarrow \text{TEXT}$$

Again, regions that do not belong to picture or text clusters are considered as by default set as graphics regions. The coefficients $\alpha$, $\beta$, a, b, c were determined experimentally by observing the data from a large collection of regions from a set of test images. For the current selection of the pixel block size and the threshold levels, the following set of values were found to provide an optimization for these coefficients, although in particular circumstances, other values may also provide improved or suitable results: $\alpha=1.0$, $\beta=1.0$, $a=0.7$, $b=1.0$, $c=1.0$.

Figure 3C:
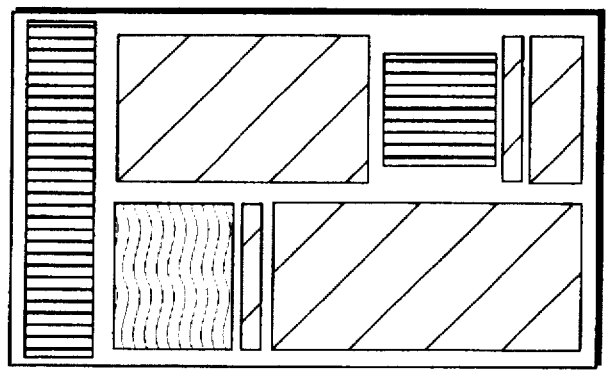
FIGS. 3A, 3B and 3C show an exemplary representation of the segmentation stages of an embodiment of the system of the present invention.
Figure 3B:
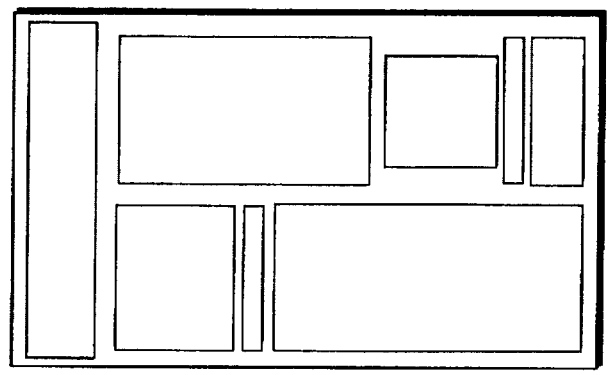
Figure 3A:
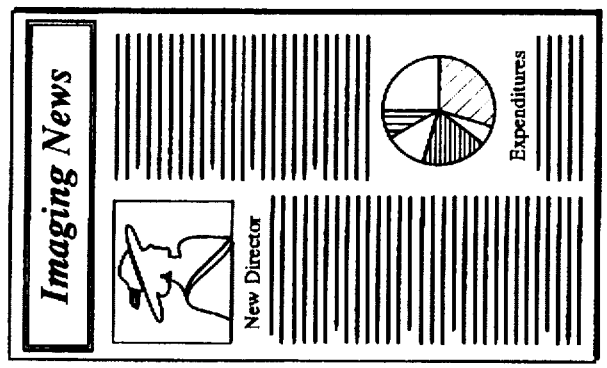

FIGS. 3A, 3B and 3C show representative classification stages for a sample original test document in accordance with the FIG. 1 system. The original image (FIG. 3A) transitions to the result of the region separation algorithm (FIG. 3B), which then transitions to the object identified output (FIG. 3C). Clearly, the accuracy of the classification depends significantly on the input region separation result (FIG. 3B). The ultimate object classification (FIG. 3C) may be erroneous when particular segmented image regions include statistical data that belongs to more than one class of data. For example, if a region contains both some text and a picture, it may be unpredictably (and undesirably) classified as any of the three object types. The reliability of object classification can be improved by using a separator region instead of separator lines, and by using more complex methods to classify the regions that fall inside the separator regions. In this manner, FIGS. 3A, 3B and 3C show the basic stages of the system of the present invention described in FIG. 1. An unaltered document (FIG. 3A) is divided in the first stage (FIG. 3B) into regions by analyzing image intensity variations, as shown generally in the "Segment and Isabel Image Regions", "Perform Edge Detection According to Intensity Transitions in each Image Region" and "Determine Image Intensity of Each Image Region" blocks of the flow chart of FIG. 1. In the second stage, the segmented regions are classified as text, picture or graphics (according to the remaining portion of the FIG. 1 flow chart).

There are a number of examples of a collection or combination of images such as may be useful outputs in other embodiments of the system of the present invention. Regions identified as "text" may in fact may include (or be modified to contain) line drawings on a plain background as well as text. Regions that are tagged as graphics may contain halftone or contone backgrounds with line drawings and text on them. Regions that are tagged as pictures may have images of natural (bitmap) scenes and objects. This low-level classification of regions system can then be used as a efficient platform for future complex cognitive tagging of the contents of the document image, yet is general enough to be applicable to a wide variety of images. Image classification is a means to an end, not the end itself. The desired outcome is the highest possible rendering of composite or various uniform images As such, in certain embodiments of the system and method of the present invention, identification of images as text, graphics or pictures may be a superfluous. That is, the important aspects of any image from a rendering standpoint is the efficient and effective use of various imaging information available so as to render the image in the highest quality manner possible. (See the discussion above on the "nature" of text and pictures.) Any effective manner of differentiating image regions that will lead to this improved quality rendered image can be highly useful; depending on the situation, three classifications may be more than are needed or not enough. As such, in more developed implementations, classification of a region as text, graphic or pictorial may be disregarded, and an automatic imaging system involving many classes may be implemented. Such a system would allow even greater latitude in differentially rendering images, which would be based on an evaluation of image attributes or nature, without concern for "traditional" image classes like text, graphic and picture.

Image color can also play an important role in how particular image areas are rendered. For example, light colors such as yellow may be less sensitive to image artifacts. Transparencies may require less toner on the clear substrate to appear as vivid as possible, rather than simply "graying out" as projected light is blocked out. Multicolored, light colored, low toner/ink density or other non-black or non-standard text with varied colors in letters or within a line may be best rendered with other than a standard text rendering selection. As such, the output of the system of the present invention may include identification of image regions not according to class, but rather according to otherwise numbered, descriptive or otherwise labeled classes. For example, more descriptive explanations might prove more useful in determining how to render a particular image area:

Class 1: Area requires solid, dark toner/ink coverage with well defined borders for high contrast of the with a background area.

Class 2: Area requires lighter toner/ink coverage for contrast of the with a dark background area.

Class 3: Area requires solid toner/ink coverage with a uniform appearance; may include multicolored images.

Class 4: Area requires lighter ("highlight") toner/ink coverage for halftoned areas, to include for a colored transparency or fleshtones on a white background.

Class 5: Area requires higher contrast, medium to dark halftoned toner/ink coverage with uniform appearance, such as a vivid color photograph.

The above classes/descriptions are set forth as one example of an output of the present invention that may be other than traditional text, graphic or picture labeling of an image area, region or cluster. Different halftoning and colorization methods may be implemented in each class. In certain embodiments, while color data may not be evident from the image classification system of the present invention, a user may select the among the various options according to knowledge of the image to rendered. Further, another embodiment can include allowing a user to select from a menu (such as the above five) image rendering options to be used according to a segmentation/classification system having less that five options (such as three options as described in association with FIGS. 1 through 4). In another embodiment, a "Draft mode" may be designated to use a particular set or combination of rendering selections, while a "transparency mode" may use another combination.

Figure 4:
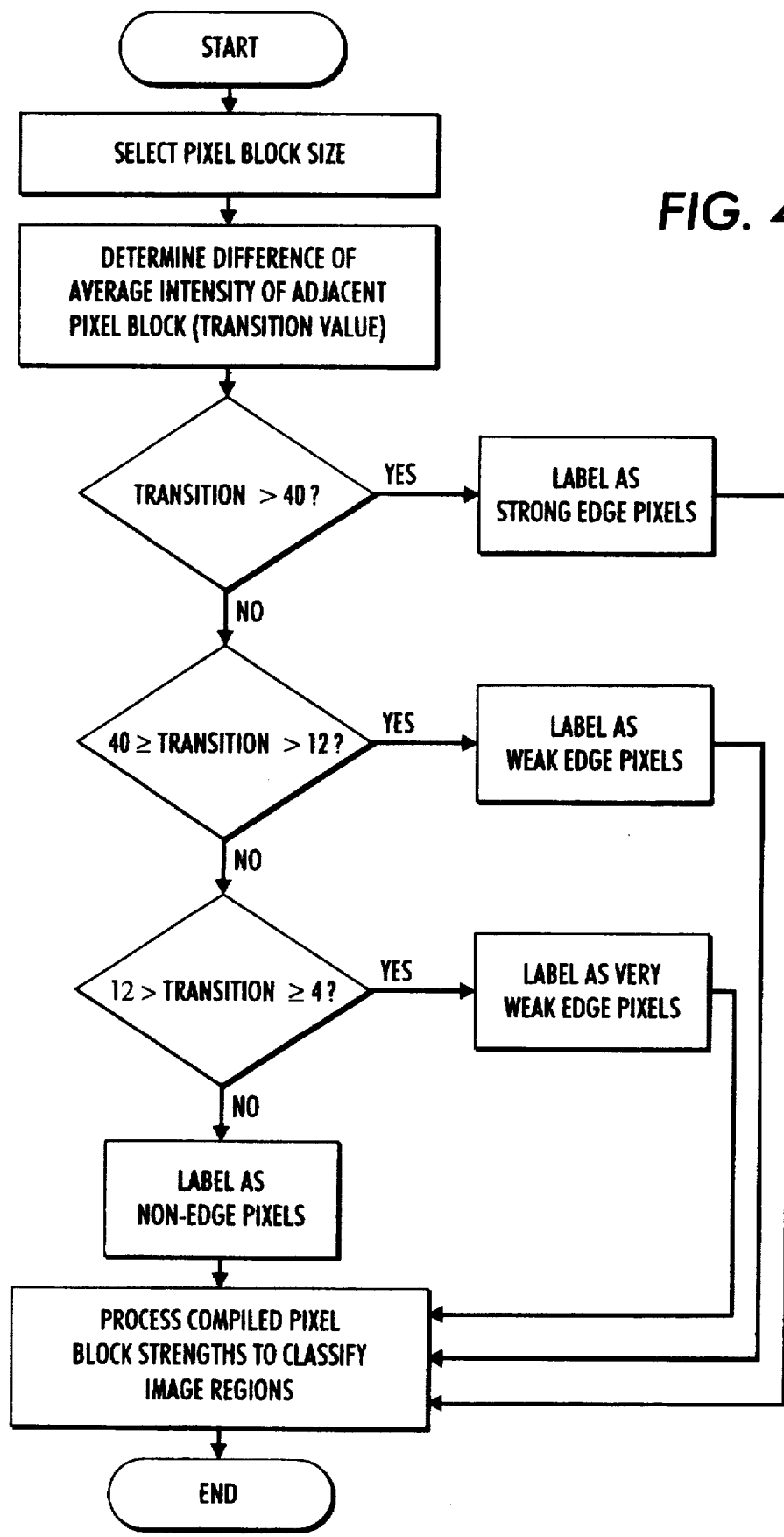
FIG. 4 is a flowchart showing the exemplary thresholding useful in conjunction with the present invention.

FIG. 4 shows an embodiment of the system of the present invention in which a set of counters is maintained for each region label. A default or variable pixel block size is selected. At each pixel block, the background, strong edge, and weak edge counters of the corresponding region are evaluated to determine the edge intensity label. The micro detection output is then used for "counting" the background pixels in an image region. The edge detection output is also used for counting the number of weak and strong edges in an image region. The necessary statistics of all the regions of the input image are accumulated scan line by scan line. (Note the selected exemplary selected transition evaluation scheme, for differentiating the relative strength of the edge pixels of image regions.) The acquired statistics from these pixel counting/strength evaluation systems allows the "cluster" regions to be divided into the desired classes (such as the three class text, pictorial and graphic selections shown). Two quadratic separators are then employed to differentiate the clusters. Using these separators, each region in the input image is classified as text or graphics or picture regions.

As previously described herein in general terms, FIG. 4 shows a particular thresholding scheme in which edge detection is performed by estimating the strength of a plurality of gray intensity transitions in an image. The intensity transition strength is measured by computing the difference of average intensity values of adjacent pixel blocks of suitably selected size. The intensity transition strength at each pixel as shown in FIG. 4 is into four classes, and then quantitized. (A greater or lesser number of classes may be used, according to a desired selectable or fixed set size system.) The classes are separated by three thresholds, namely very-low-threshold, low-threshold and high-threshold. If the transition strength is greater than the high-threshold, the corresponding pixels are labeled as strong-edge pixels. If the intensity transition strength is in between high-threshold and low-threshold, the corresponding pixels are labeled as weak-edge pixels. If the intensity transition strength is in between low-threshold and very-low-threshold, the corresponding pixels are labeled as very-weak-edge pixels, and the rest of the pixels are labeled as non-edge-pixels. As shown in FIG. 4, a set of default values are used, such as: below threshold being less than 4; very-low-threshold being between 4 and 12, low-threshold being between 12 and 40; and high-threshold being greater than 40. A selected exemplary pixel block size may be 6×6 (36) pixels, although other (variable or fixed) block sizes may be used, depending on user preference or a particular application.

The various rendering selections of the present invention as described herein may be implemented by default, though menu selection via a user interface or according to an automatic selection or detection system that evaluates image regions.

While the present invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An image rendering system for processing a stream of data in a document processing system, said stream of data including segmentable imaging data for rendering an output image, said output image capable of being differentially rendered according to a plurality of image classes, said image rendering system comprising:
   a segmentor for dividing the imaging data into a plurality of image regions;
   a selector for assigning said regions to each image class; and
   a processor, responsive to said selector, for differentially rendering the output image according to at least one of the plurality of image classes;
   said segmentor including,
      a transition intensity detector for determining a set of edges of each segmented region, and
      an image intensity detector for determining an image edge intensity of each image region in the set of edges of each region wherein the image edge intensity is used to assign each image region to each image class.

2. The system of claim 1, wherein the image classes include a text class image type, a graphic class image type and a pictorial class image type.

3. The system of claim 1, wherein at least one image class includes at least two image types selected from the group of: a text image type; a graphic image type; and a pictorial image type.

4. The system of claim 1, wherein said transition intensity detector labels each region according to a plurality of predetermined intensity ranges for assignment with to one of the plurality of image classes.

5. The system of claim 4, wherein predetermined intensity ranges include a strong edge pixels, weak edge pixels and very weak edge pixels.

6. The system of claim 1, wherein at least one first image class is determined and wherein at least one second image class is selected by default.

7. The system of claim 6, wherein the at least one second image class selected by default is a graphical type image class.

8. The system of claim 1, wherein each image region includes a selected block size of pixels.

9. The system of claim 8, wherein the block size of pixels is predetermined.

10. The system of claim 8, wherein the block size of pixels is variable.

11. The system of claim 1, wherein a halftoning sheme is assigned to each image class.

12. The system of claim 1, wherein a colorization scheme is assigned to each image class.

* * * * *